US007707516B2

(12) United States Patent  
O'Mullan et al.

(10) Patent No.: US 7,707,516 B2
(45) Date of Patent: Apr. 27, 2010

(54) EMBEDDED NAVIGATION INTERFACE (75) Inventors: Beth Ellyn O'Mullan, Danville, CA (US); John Rohlf, Mountain View, CA (US); Audrey Kaplan, Redwood City, CA (US)

(73) Assignee: Google Inc., Mountain View, CA (US)

( * ) Notice: Subject to any disclaimer, the term of this patent is extended or adjusted under 35 U.S.C. 154(b) by 390 days.

(21) Appl. No.: 11/442,227

(22) Filed: May 26, 2006

(65) Prior Publication Data
US 2007/0273712 A1 Nov. 29, 2007

(51) Int. Cl.
G06F 15/177 (2006.01)
(52) U.S. Cl. ...................... 715/834; 715/850
(58) Field of Classification Search ............. 715/788, 715/834, 854, 855, 848, 850, 851, 734, 735, 715/736, 771; 345/161, 650, 661, 676, 679, 345/680, 682, 418, 619
See application file for complete search history.

(56) References Cited

U.S. PATENT DOCUMENTS

| | | | | |
|---|---|---|---|---|
| 5,557,714 | A * | 9/1996 | Lines et al. | 345/653 |
| 5,864,337 | A * | 1/1999 | Marvin | 715/708 |
| 6,501,469 | B1 * | 12/2002 | MacPhail | 345/419 |
| 6,772,142 | B1 * | 8/2004 | Kelling et al. | 707/3 |
| 7,353,114 | B1 * | 4/2008 | Rohlf et al. | 702/5 |
| 2002/0103597 | A1 * | 8/2002 | Takayama et al. | 701/200 |
| 2002/0112237 | A1 * | 8/2002 | Kelts | 725/39 |
| 2004/0027395 | A1 * | 2/2004 | Lection et al. | 345/855 |
| 2004/0215816 | A1 * | 10/2004 | Hayes et al. | 709/238 |
| 2005/0134578 | A1 * | 6/2005 | Chambers et al. | 345/184 |
| 2005/0188313 | A1 * | 8/2005 | Matthews et al. | 715/741 |
| 2007/0247647 | A1 * | 10/2007 | Pettigrew et al. | 358/1.9 |

FOREIGN PATENT DOCUMENTS

| EP | 0717344 | 6/1996 |
|---|---|---|
| NL | C 1029724 | * 10/2005 |

OTHER PUBLICATIONS

Tse et al., Enabling Interaction with Single User Applications through Speech and Gestures on a Multi-User Tabletop, May 2006. pp. 339-340.*
England's Strategic Health Authorities(SHA) Information Map, Sep. 2005, p. 2.*

(Continued)

Primary Examiner—Thanh T Vu
(74) Attorney, Agent, or Firm—Fish & Richardson P.C.

(57) ABSTRACT

A navigation interface is embedded in imagery and includes various controls for manipulating the imagery. The controls provide various navigation operations, including but not limited to: rotation, tilt, zoom and 360 degree. In some implementations, one or more controls can be operated to restore the imagery to a predetermined state. Some implementations include a control for providing 360 degree movement of imagery. One or more controls can provide incremental and continuous motion of imagery. The navigation interface can fade out or otherwise be obfuscated when the user is not interacting with the navigation controls. A compass or other graphic can replace the navigation interface when it is no longer displayed.

51 Claims, 9 Drawing Sheets

Imagery Restored To
Predetermined Orientation

OTHER PUBLICATIONS

Inside Keyhole's EarthViewer, Mar. 2002, vol. 2 Issue 3, pp. 80-81.*
Geospatial on Demand, Earth Imaging Journal, Jul./Aug. 2004.*
PC Magazine Review, by Richard V. Dragan, FIG112222004 belong together, Nov. 22, 2004. Keyhole 2 Pro.*
New Views of Planet Earth, Feb. 28, 2002, Dan Dubno.*
Apple Inc.: "Quicktime VR", Jun. 4, 2005, XP002458434 Retrieved from the Internet: http://developer.apple.com/documentation/QuickTime/InsideQT-QTVR/insideqt_qtvr.pdf, 52 pages.
Himesh, et al., "Enhancements to SAS/Graph in V9", Apr. 17, 2002, XP002458436 Retrieved from the Internet: http://www2.sas.com/proceedings/sugi27/p137-27.pdf, 10 pages.
International Search Report in corresponding application PCT/US2007/069796 dated Dec. 3, 2007, 4 pages.
RCATS: "Google Earth: Interfacing with RCATS telemetry systems", Mar. 31, 2006, XP002458457 Retrieved from the Internet: http://www.rcatsystems.com/pdf/GE_instructions.pdf, 8 pages.
Steve's Digicam Online, Inc.: "QuickTime VR Tour Canon PowerShot A80", Mar. 17, 2006, XP002458435 Retrieved from the Internet: http://web.archive.org/web/20060317053420/www.steves-digicams.com/2003_reviews/a80?qtvr.html, 1 page.
"Using Keyhole 2 PRO/EC Version 2.2", 2004, USA, 146 pages.
"Keyhole 2 LT/NV Quickstart Guide", USA, 9 pages.
International Preliminary Report on Patentability for PCT/US2007/069796, dated Dec. 11, 2008, 7 pages.
"Using Keyhole 2 PRO/EC Version 2.2", 2004, USA, 146 pages.
"Keyhole 2 LT/NV Quickstart Guide", USA, 9 pages.
Flash Earth - Controls for Navigating Images, [online], 2006 (retrieved on Oct. 9, 2009). Retrieved from the Internet: <URL:http://web.archive.org/web/20060526104154/www.flashearth.com/>, 4 pages.
Keyhole 2 Fusion Manual, Version 2.3, 2005, Keyhole, Inc., 195 pages.

* cited by examiner

EMBEDDED NAVIGATION INTERFACE

TECHNICAL FIELD

The disclosed implementations are generally related to user interfaces for computer graphics systems.

BACKGROUND

Dramatic improvements in computer processing power and broadband streaming technology have lead to the development of interactive three-dimensional (3D) computer graphics for navigating imagery (e.g., 3D map imagery). Interactive 3D computer graphics typically provide a user interface (UI) with navigation controls for dynamically navigating imagery. The navigation controls enable the user to tilt, pan, rotate and zoom the imagery at a point of interest.

Conventional navigation controls are often located on a tool bar in the UI which is separate from the image display area. Having the navigation controls located at a different location in the UI than the imagery can consume screen space which could be otherwise used for providing additional UI functionality, advertising and the like. Moreover, having the navigation controls separate from the imagery can force the user to take their eyes off the imagery while navigating.

Conventional navigation controls may only allow the user to make incremental movements through the imagery by continuously clicking a navigation control. While such navigation controls are adequate for navigating small areas within the navigation environment, when used to navigate larger areas these tools can be tedious to use. Moreover, when the user has navigated to a new state, conventional navigation controls fail to provide a way to restore the imagery to its initial state. This deficiency forces the user to restore the initial state by re-entering the location or coordinates of the point of interest.

SUMMARY

The deficiencies described above are overcome by the disclosed implementations of an embedded navigation interface.

In some implementations, a method of navigating imagery includes: providing a user interface for presentation on a display device, the user interface including a display area for presenting imagery; and providing a navigation interface overlying the imagery, the navigation interface including a rotation control for continuously rotating the imagery in the display area in response to a user interaction with the control.

In some implementations, a method of navigating imagery includes: providing a user interface for presentation on a display device, the user interface including a display area for presenting imagery; and providing a navigation interface overlying the imagery, the navigation interface including a rotation control in the shape of a wheel, the wheel including a restore mechanism for restoring the imagery to a predetermined state in response to a user interaction with the restore mechanism.

Other implementations of an embedded navigation interface are disclosed that are directed to methods, systems, apparatuses, computer-readable mediums, devices and user interfaces.

DETAILED DESCRIPTION

Navigation Interface

Figure 1:
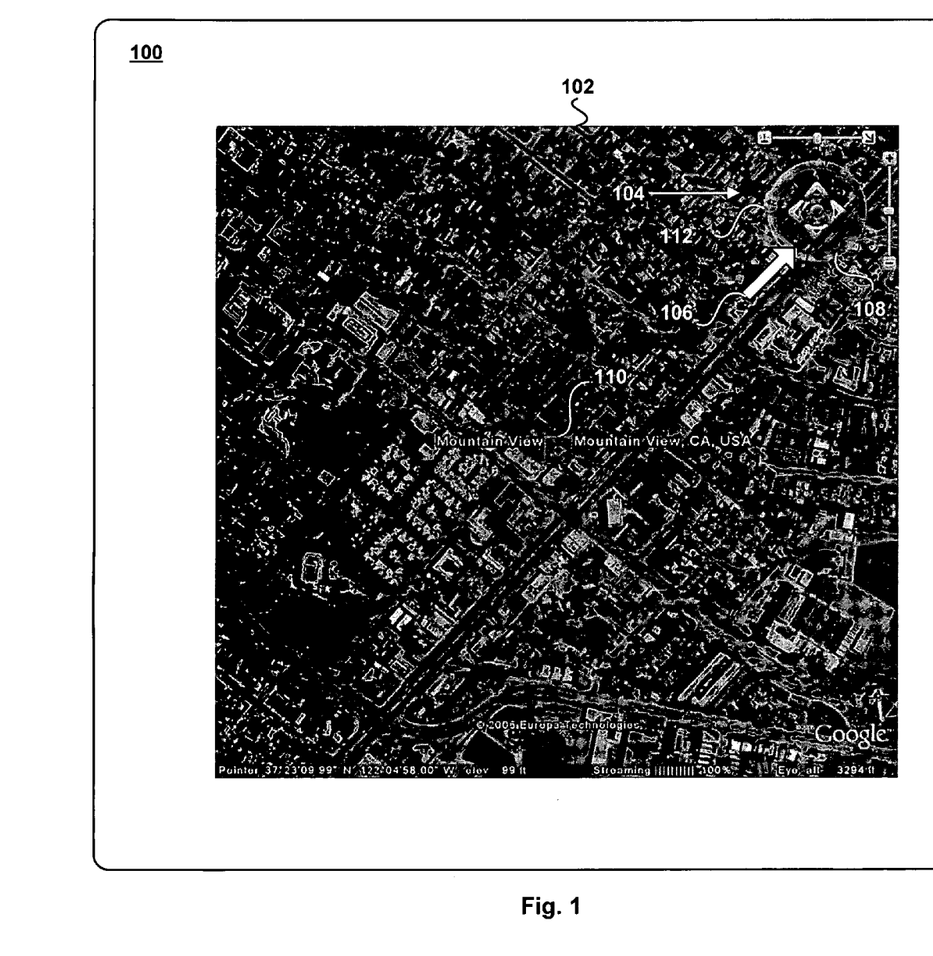
FIG. 1 is a screen shot of a UI including an exemplary embedded navigation interface for navigating imagery.

FIG. 1 is a screen shot of a UI 100 including an embedded navigation interface 104 for navigating imagery 102. In some implementations, the UI 100 is provided by a 3D mapping tool, such as Google Earth®, developed by Google Inc. (Mountain View, Calif.). The UI 100 can be generated for presentation on a display device for a user system, a described in reference to FIG. 6. A user system can be any device capable of displaying and navigating imagery, including but not limited to: personal computers, mobile phones, game consoles, personal digital assistants (PDAs), television devices, media players and the like. The imagery can be 3D imagery or two-dimensional (2D) imagery. Although the disclosed implementations are described with respect to a map tool, the embedded navigation interface 104 can be used with any tool capable of navigating imagery.

When the map tool is launched on the user system, the navigation interface 104 is displayed overlying the imagery 102. The navigation interface 104 can be initially located anywhere in the imagery 102 based on a preset location, which can be changed by the user through a user interface element (e.g., preference pane, menu, etc.). In some implementations, the user can click and drag the navigation interface 104 to any location in the imagery 102. The navigation interface 104 can be made semi-translucent to allow the imagery 102 to be viewed by the user through the navigation interface 104. In some implementations, the navigation interface can be resized by clicking on a portion (e.g., a handle) of the navigation interface 104 with, for example, a mouse cursor 106 and dragging the handle across the imagery 102 using known techniques for resizing graphical objects in a UI.

The navigation interface 104 includes a rotation control 108 for rotating the imagery 102 about an axis that is perpendicular to the imagery 102. The axis can be located at the location of interest, which in this example is the center of the imagery 102. A bounding box 110 or other visual cue can be displayed around the location of interest to orientate the user. In the example shown, the user clicked and dragged the rotation control 108 counterclockwise by about 45 degrees from its initial orientation, as indicated by the position of thumb 112. The thumb 112 acts as a North direction indicator and provides North restore functionality, as described in reference to FIGS. 4*a* and 4*b*. The initial orientation of the imagery 102 can be displayed so that the thumb 112 points to the top of the UI 100. Other initial orientations of the imagery 102 are possible. The various controls in the navigation interface 104 are described more fully in reference to FIG. 3a.

Figure 2:
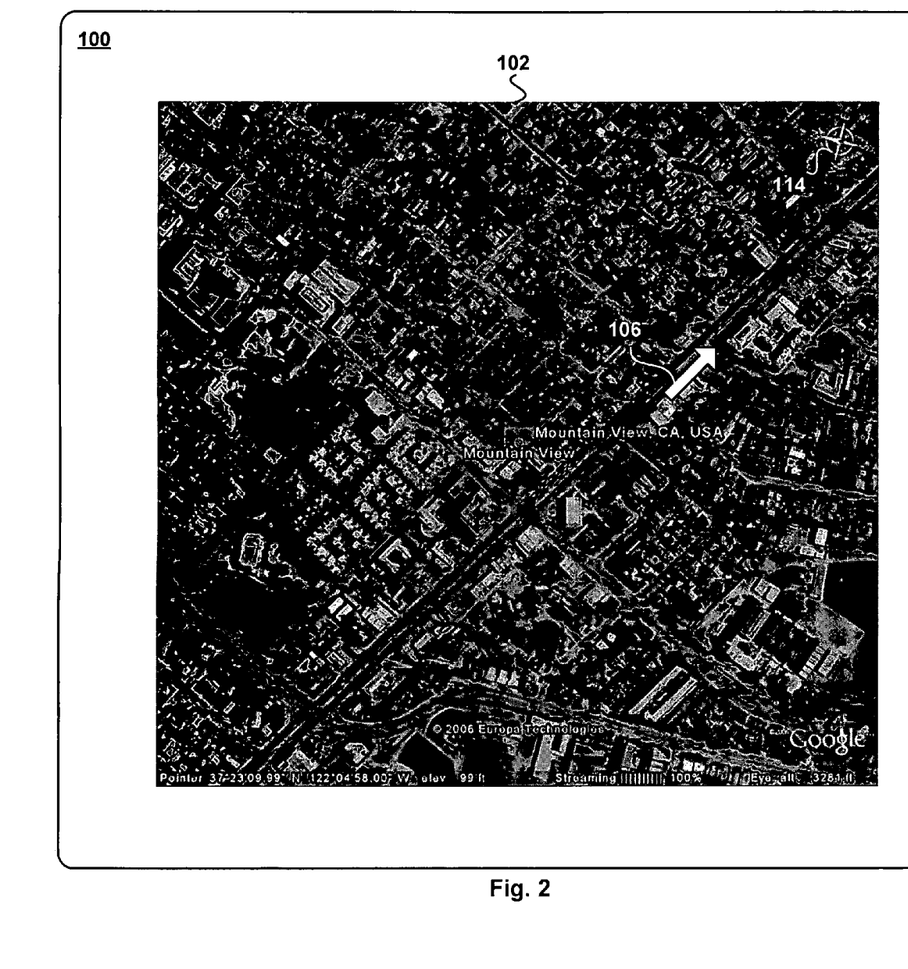
FIG. 2 is a screen shot of the UI of FIG. 1 with an exemplary embedded compass.

FIG. 2 is a screen shot of the UI of FIG. 1 with an embedded compass 114. In some implementations, the navigation interface 104 is associated with a "hot spot" that is responsive to movements of the cursor 106. For example, if the user moves the cursor 106 outside the "hot spot," the navigation interface 104 fades out, or is otherwise obfuscated, and the compass 114 is displayed. The compass 114 indicates the current orientation of the imagery 102 in the UI 100 when the navigation interface 104 is not active (i.e., not visible in the UI 100). When the user moves the cursor 106 outside the "hot spot," the compass 114 fades out, or is otherwise obfuscated, and the navigation interface 104 reappears, as shown in FIG. 1. Thus, the user can toggle between the navigation interface 104 and the compass 114 by moving the cursor 106 in and out of the "hot spot." Alternatively, the toggling can be achieved through interaction with other input mechanisms and devices, such as hot key combinations, mouse clicks, menus and the like. In some implementations, the user can choose to have the compass 114 appear or not appear after the navigation interface 104 fades out.

In some implementations, when the user moves over the hotspot, the compass 114 (or other computer graphic) can be animated to transition to the navigation interface 104. For example, the ring of the compass 114 can be animated to grow into the rotation control 108 of the navigation interface 104, and the other controls (e.g., the tilt and zoom controls) can fade-in to the navigation interface 104. Other types of animation transitions are possible.

Other graphical objects can be used in place of the compass 114 or in combination with the compass 114 for providing directional information to the user when the navigation interface 104 is not active.

Navigation Controls

Figure 3A:
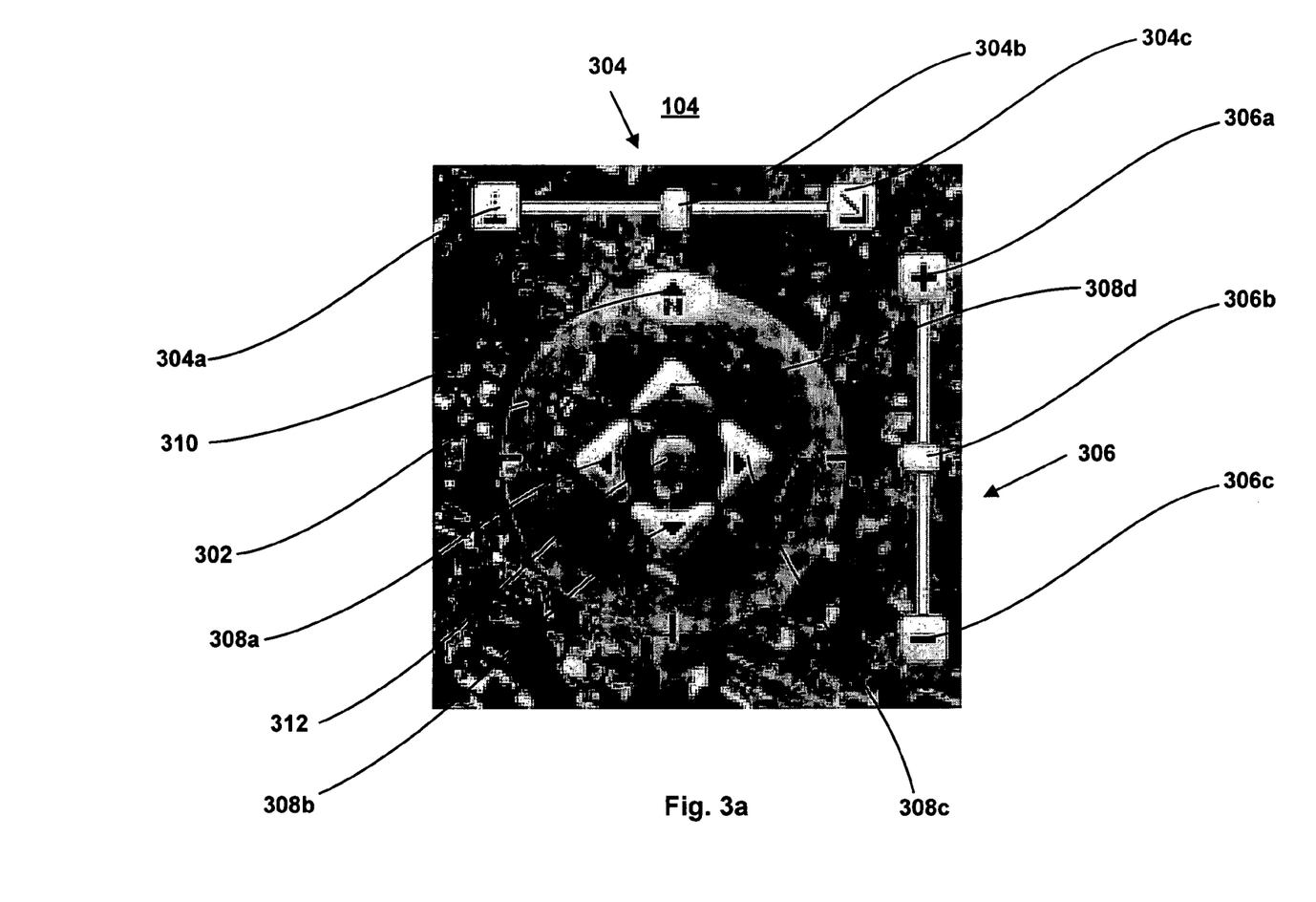
FIG. 3*a* is a screen shot of a more detailed view of the embedded navigation interface shown in FIG. 1.

FIG. 3a is a screen shot of a more detailed view of the embedded navigation interface 104 shown in FIG. 1. In some implementations, the navigation interface 104 includes a rotation control 302, a tilt control 304, a zoom control 306, buttons 308a-308d and a joystick 312. These controls can be presented as semi-translucent when not being interacted with by the user (e.g., the cursor is not touching the control). When the user interacts with the controls using an input device (e.g., a mouse, joystick, trackball, etc.), the controls can be embellished (e.g., brightened, magnified, different color, etc.) to indicate an active state.

Rotation Control

In the example shown, the rotation control 302 is in the shape of a wheel. The rotation control 302 can be used to rotate imagery either clockwise or counterclockwise about an axis perpendicular to the imagery and centered at the location of interest. The user rotates imagery by clicking on any portion of the rotation control 302 and dragging the cursor to affect the rotation. The rotation control 302 allows the user to rotate smoothly in all directions without incremental stops. In some implementations, the rotation control 302 includes "sticky" points at North, South, East and West to help the user hit an exact target orientation. For example, if the user cannot accurately target quarter angle positions (90°, 180°, 270°, 360°), dragging the rotation control 302 to a position close to the target quarter angle position causes the rotation control 302 to jump or "stick" to the target quarter angle position. The user experiences a "bump" in the ring movement at these points and can elect to "drop" the ring position within the bump, i.e., dropping the ring position into the target quarter angle position. The "sticky" point feature can also be applied to other controls in the navigation interface 104, as desired. The rotation control 302 includes a thumb 310, which provides a North direction reference and North restore functionality, as described in reference to FIGS. 4a and 4b.

Tilt Control

The tilt control 304 is used to tilt the imagery up or down. In some implementations, the tilt control 304 includes a slider 304b and slider ends 304a and 304c. The user can tilt the imagery up or down by clicking and dragging the slider 304b between slider ends 304a and 304c. For example, moving the slider 304b towards slider end 304c tilts the imagery down and moving the slider 304b towards slider end 304a tilts the imagery up. In some implementations, single clicking the slider ends 304a, 304c, causes the imagery to be incrementally tilted up or down through a predetermined tilt range (e.g., 0-90 degrees), until the user ceases clicking or a predetermined tilt limit is reached. If the user clicks (e.g., double clicks) or clicks and holds the slider ends 304a, 304c, the imagery is continuously and smoothly tilted through the tilt range without further user interaction until the predetermined tilt limit is reached or until the continuous tilting motion is terminated by the user. The user can terminate the continuous tilting motion by clicking (e.g., single clicking) anywhere in the imagery or the navigation interface 104. For example, a continuous tilting operation can be cancelled with a single click on the tilt control 304 or other control (e.g., rotation control 302, zoom control 306, etc.) in the navigation interface 104. Other forms of tilt controls can be provided with incremental and continuous tilting capability, as desired (e.g., dials, knobs, etc.).

Figure 3B:
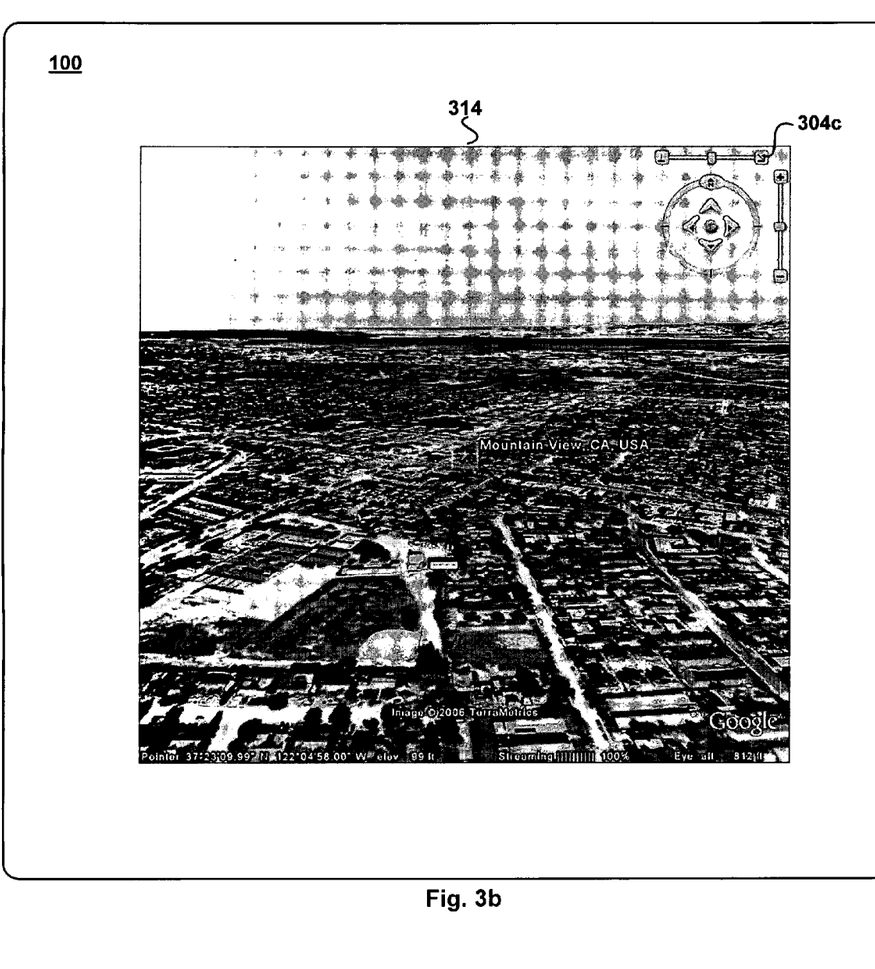
FIG. 3*b* is a screen shot of the UI of FIG. 3*a* illustrating an exemplary tilt control.

FIG. 3b is a screen shot of imagery 314 that has been tilted downward as result of double clicking the slider end 304c. Notice how the user's perspective has changed from a "bird's eye" view to a view of the horizon.

Zoom Control

Referring again to FIG. 3a, the zoom control 306 is used to zoom the imagery in or out in the display area of the UI 100. In some implementations, the zoom control 306 includes a slider 306b and slider ends 306a and 306c. The user can zoom the imagery in or out by clicking and dragging the slider 306b between slider ends 306a and 306c. For example, moving the slider 3064b towards slider end 306c zooms the imagery out and moving the slider 304b towards slider end 306a zooms the imagery in. In some implementations, single clicking the slider ends 306a, 306c, causes the imagery to be incrementally zoomed in or out through a predetermined zoom range until the user ceases clicking or a predetermined zoom limit is reached. If the user clicks (e.g., double clicks) or clicks and holds the slider ends 306a, 306c, the imagery is continuously and smoothly zoomed through the zoom range without further user interaction until the predetermined zoom limit is reached, or until the continuous zooming motion is terminated by the user. The user can terminate the continuous zooming motion by clicking (e.g., single clicking) anywhere in the imagery or the navigation interface 104. For example, a zooming operation can be cancelled with a single click on the tilt control 304 or other control (e.g., rotation control 302, tilt control 304, etc.) in the navigation interface 104. Other forms of zoom controls can be provided with incremental and continuous zooming capability, as desired (e.g., dials, knobs, etc.).

Figure 3C:
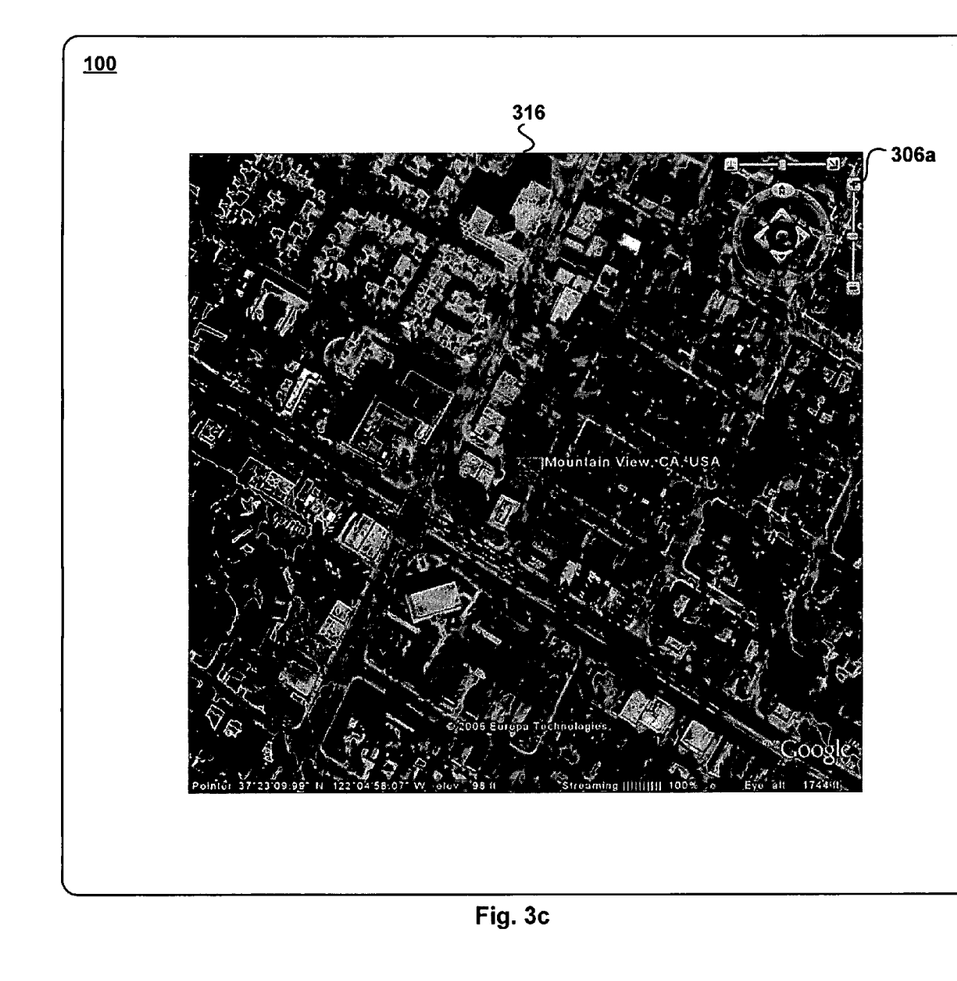
FIG. 3*c* is a screen shot of the UI of FIG. 3*a* illustrating an exemplary zoom control.

FIG. 3c is a screenshot of imagery 316 that has been zoomed in on as a result of double clicking the slider end 304c. Notice how the location of interest (Mountain View, Calif.) has been zoomed in to show more detail.

Button Controls

Referring again to FIG. 3a, the button controls 308a-308d are located inside the wheel of the rotation control 302 and are used to move the imagery left, down, right and up, respectively. In some implementations, single clicking the buttons 308a-308d, causes the imagery to be moved until the user ceases clicking. If the user clicks (e.g., double clicks) or clicks and holds the buttons 308a-308d, the imagery is continuously and smoothly moved without further user interaction until the continuous motion is terminated by the user. The user can terminate the continuous motion by clicking (e.g., single click) anywhere in the imagery or the navigation interface 104. For example, a continuous button control operation can be cancelled with a single click on the button controls 308 or other control (e.g., rotation control 302, tilt control 304, zoom control 306, etc.) in the navigation interface 104. Other forms of controls for moving imagery left, down, right and up can be provided with incremental and continuous movement capability, as desired (e.g., dials, knobs, sliders, etc.).

Joystick Control

The navigation interface 104 can include a joystick 312 to allow 360 degree movement of imagery using an input device. The user can click and hold the joystick control 312, then move the joystick 312 to affect 360 degree movement of the imagery. In some implementations, the speed of the moving imagery is a function of the amount of deflection of the joystick control 312 from its rest position. The smaller the deflection the slower the speed of movement. In some implementations, the motion of the joystick control 312 is married to the button controls 308a-308d, so that the joystick control 312 moves in tandem with the button controls 308a-308d. Thus, if a user interacts with the button controls 308a-308d, the user will "discover" the joystick control 312 by observing its motion in response to interaction with the button controls 308a-308d.

Restore Functionality

Figure 4A:
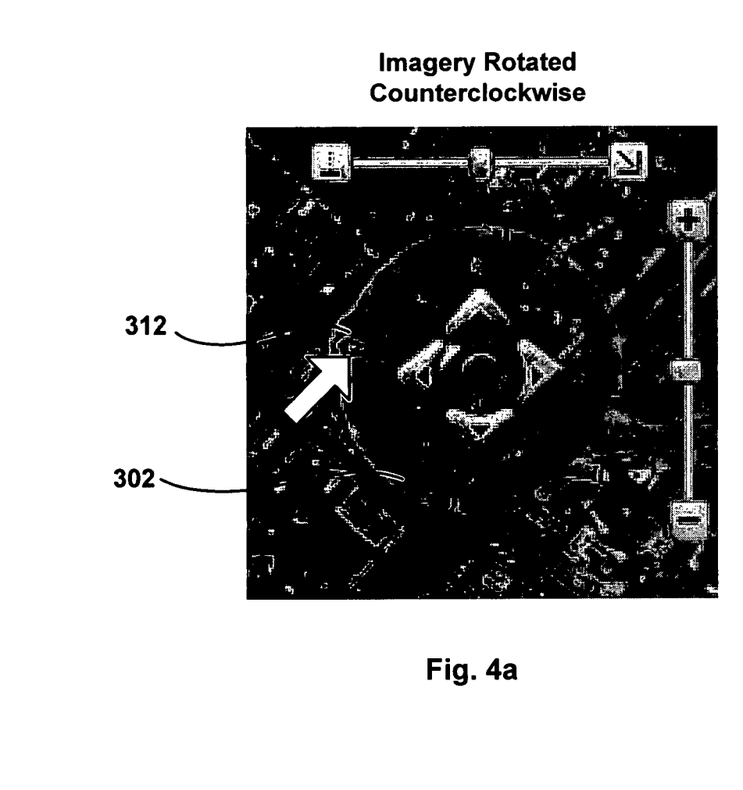
FIGS. 4*a* and 4*b* are screen shots illustrating an exemplary restore function for a rotation control.
Figure 4B:
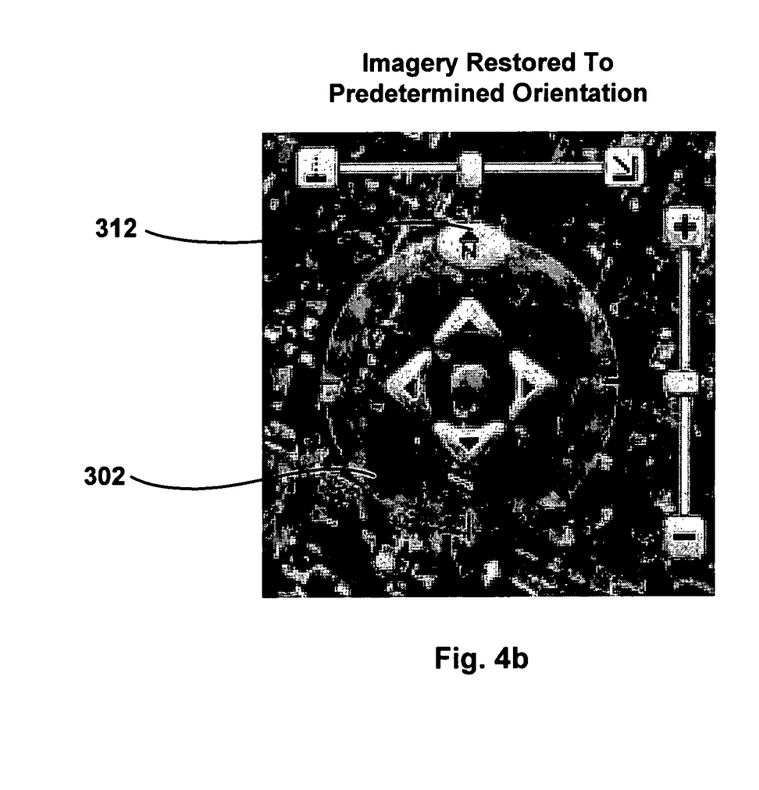

FIGS. 4a and 4b are screen shots illustrating restore functionality associated with the rotation control 302. In some implementations, the rotation control 302 includes a thumb 312. The user can restore the imagery to a predetermined state by clicking on the thumb 312. In FIG. 4a, the user has rotated the imagery counterclockwise by about 45 degrees, as indicated by the location of the thumb 312. In the example shown, the thumb 312 indicates the North direction in addition to providing restore functionality. When the user clicks the thumb 312, the imagery is restored to a predetermined state, as shown in FIG. 4b. In some implementations, if the user clicks the thumb 312 when the rotation control 302 has already been restored, then the user is provided with feedback (visual and/or audio) to indicate that the state has already been restored. For example, if the user clicks the thumb 312 while it is in its restored position (FIG. 4b), then the navigation interface and/or rotation control 302 can shake to provide feedback to the user that the state has already been restored. The restore functionality described above can be implemented in any controls of the navigation interface, including the tilt, zoom and button controls, described in reference to FIG. 3a.

Workflow for Navigation Interface

Figure 5:
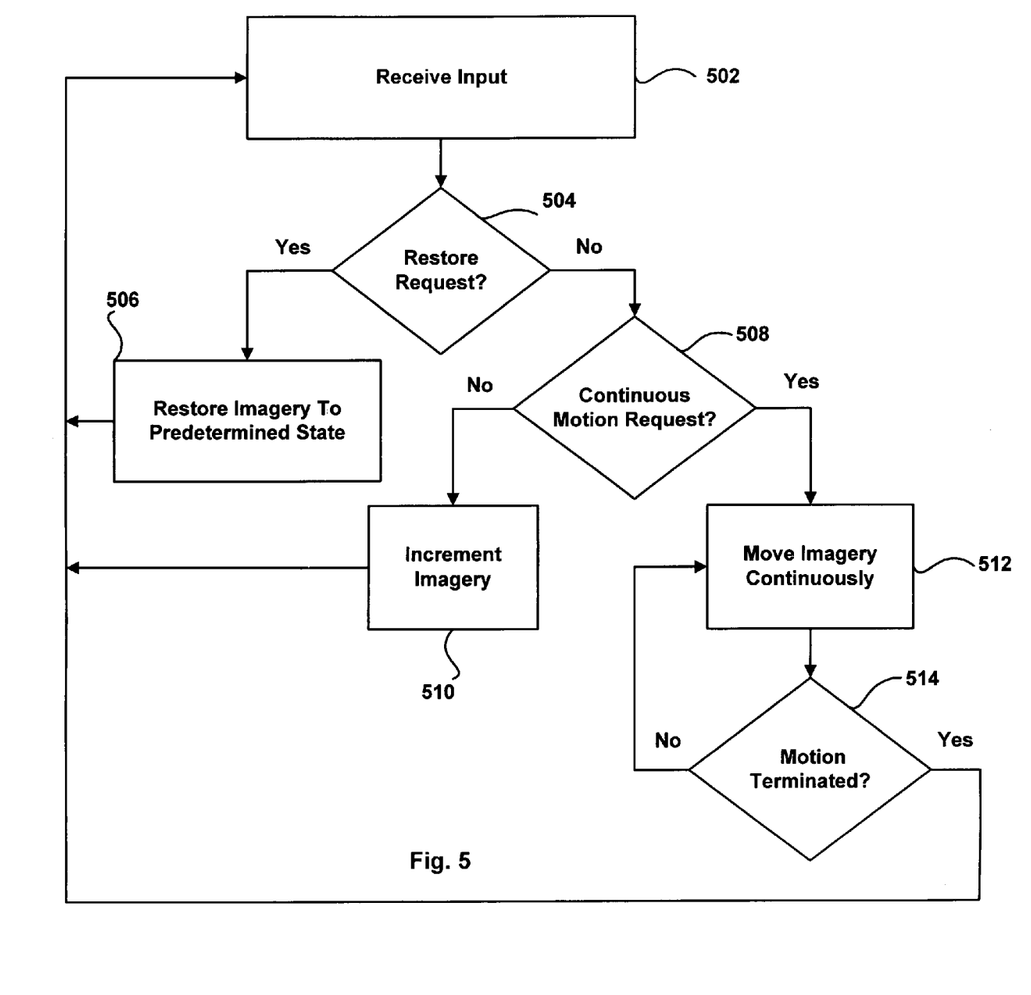
FIG. 5 is a flow diagram of an exemplary workflow for the embedded navigation interface shown in FIG. 3*a*.

FIG. 5 is a flow diagram of an exemplary workflow for the embedded navigation interface 104 shown in FIG. 3a. The workflow begins when an input is received (502). The input can be generated in response to user interaction with the navigation interface and/or automatically by an application or operating system. In one example, a restore request input is generated in response to the user interacting with the thumb 310 (e.g., 2-clicking the thumb) on the rotation control 302, as described in reference to FIG. 4a and 4b.

If the input is a restore request (504), the imagery is restored to a predetermined state (506) and the workflow returns to step (502). Otherwise, the workflow continues to step (508). If a request to move the imagery continuously is received (508), then the imagery is moved continuously (512) until the continuous motion is terminated by the user or a predetermined limit is reached (514). For example, if the user 2-clicks the side buttons 304a or 304b of the tilt control 304, the imagery will be tilted in a continuous motion, until a predetermined limit is reached or the user 1-clicks anywhere in the imagery. If a request to move the imagery continuously is not received (508), then the imagery is incremented by a predetermined amount (510). For example, each time the user 1-clicks a side button 304a, 304b, of the tilt control 304 the imagery is incremented by a predetermined amount.

Image Processing and Delivery System

Figure 6:
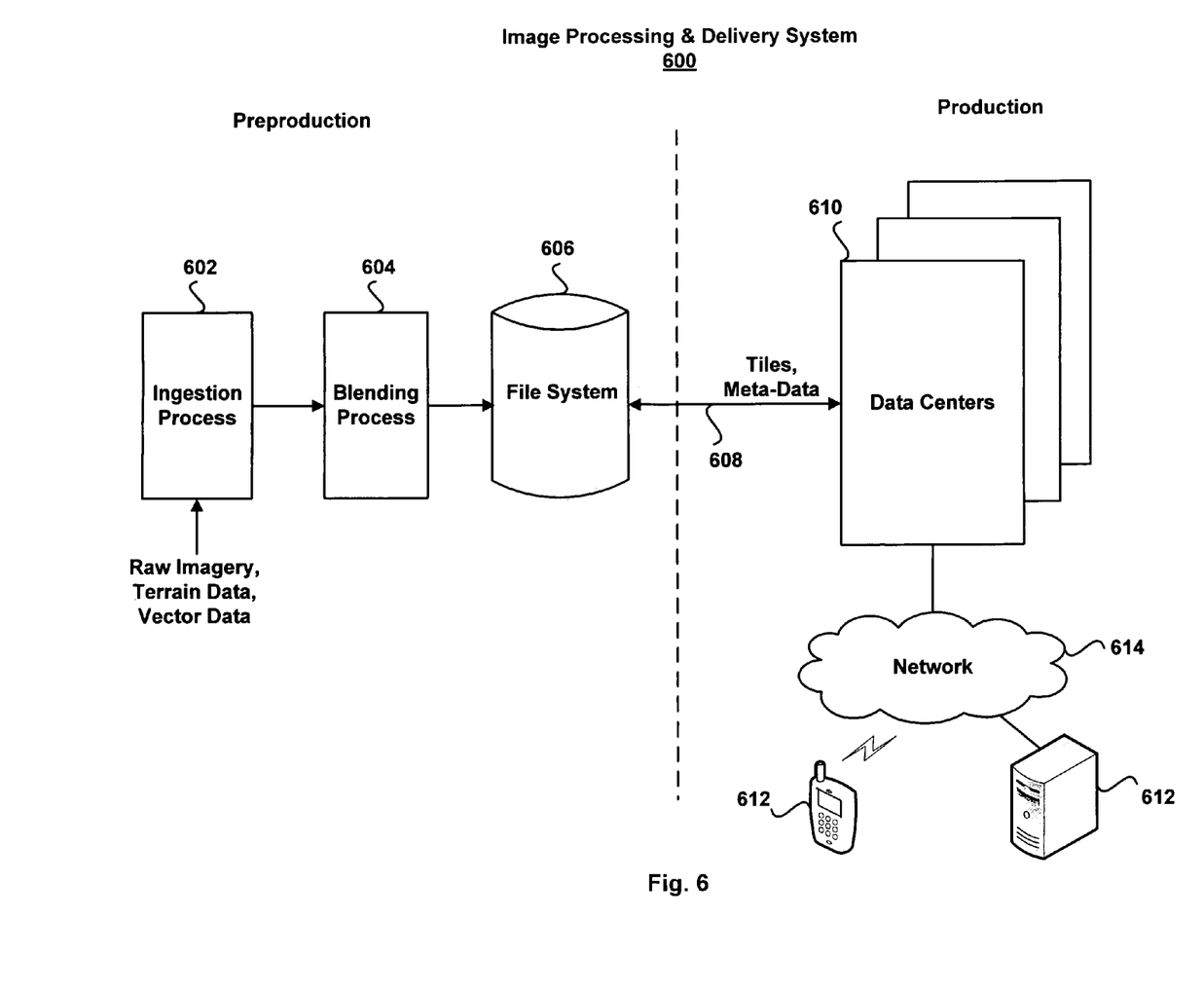
FIG. 6 is a block diagram of an exemplary image processing and delivery system for delivering imagery to a user system for use with an embedded navigation interface.

FIG. 6 is a block diagram of an exemplary image processing and delivery system 600 for processing and delivering map imagery and associated meta-data to user devices 612 for use with a 3D mapping client. When the user manipulates controls in the navigation interface, the client may request imagery from an imagery source, such as the image processing and delivery system 600.

In some implementations, the system 600 includes a preproduction phase and a production phase. The preproduction phase includes an ingestion process 602 and a blending process 604. The ingestion process 602 performs various image processing on raw imagery, including but not limited: to re-projection, tile generation, coverage and blend mask generation and multi-resolution image and mask pyramid generation, etc.

In some implementations, the blending process 604 orders and blends together processed images generated by the ingestion process 602. The blended image products are made available to datacenters 610 through a file system 606 and a delivery channel 608. The preproduction phase can be implemented using mass parallelization techniques.

In a production phase, one or more datacenters 610 retrieve the image products from the file system 606 and deliver the image products to user devices 612 through a network 614 (e.g., Internet, intranet, Ethernet, wireless network, etc.). The image products can include imagery and associated meta-data for one or more locations on the Earth. An exemplary file system 606 can be Google Inc.'s Global File System (GFS), as described in Ghemawat, Sanjay et al., "The Google File System," Association For Computing Machinery (ACM), 19th Symposium On Operating System Principles (SOSP), Oct. 19-22, 2003, Lake George, N.Y., which article is incorporated by reference herein in its entirety.

User devices 612 can be any electronic device capable of displaying a map, including but not limited to: personal computers (portable or desktop), mobile phones, smart phones, personal digital assistants (PDAs), game consoles, high definition televisions, set-top boxes, navigation systems (e.g., global positioning system (GPS)), avionics displays, etc. The system 600 is exemplary and other configurations and arrangements for image processing and delivery are possible. For example, the ingestion and blending processes could be performed in the datacenters. Also, imagery and meta-data could be provided to the datacenters 610 by different sources.

User System Architecture

Figure 7:
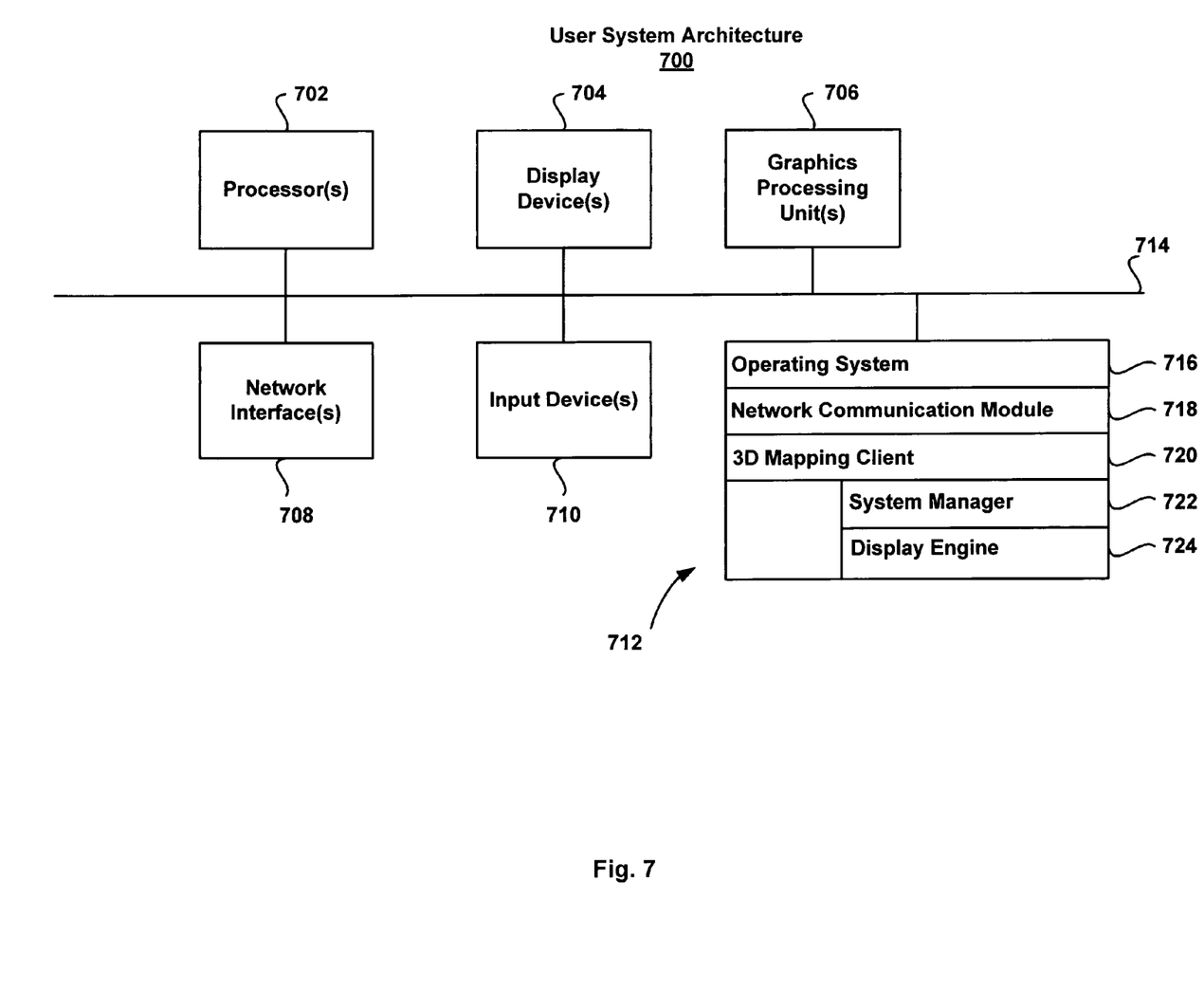
FIG. 7 is a block diagram of an exemplary user system architecture for providing a UI including an embedded navigation interface.

FIG. 7 is a block diagram of an exemplary user system architecture 700 for hosting a 3D mapping client 720, such as the Google Earth® client available from Google, Inc. The architecture 700 includes one or more processors 702 (e.g., IBM PowerPC®, Intel Pentium® 4, etc. ), one or more display devices 704 (e.g., CRT, LCD), one or more graphics processing units 706 (e.g., NVIDIA® Quadro FX 4500, GeForce® 7800 GT, etc.), one or more network interfaces 708 (e.g., Ethernet, FireWire, USB, etc.), one or more input devices 710 (e.g., keyboard, mouse, etc.), and one or more computer-readable mediums 712 (e.g. SDRAM, optical disks, hard disks, flash memory, L1 or L2 cache, etc.). These components exchange communications and data via one or more buses 714 (e.g., EISA, PCI, PCI Express, etc.).

The term "computer-readable medium" refers to any medium that participates in providing instructions to a processor 702 for execution, including without limitation, non-volatile media (e.g., optical or magnetic disks), volatile media (e.g., memory).

The computer-readable medium 712 further includes an operating system 716 (e.g., Mac OS®, Windows®, Linux, etc.), a network communication module 618 and a 3D mapping client 720. The 3D mapping client 720 further includes a system manager 722 and a display engine 724. The system manager 722 communicates with the display engine 724 and the operating system 716 to present the UI 100 and navigation interface 104 on the one or more display devices 704 (FIG. 1). The system manager 722 receives and interprets user input from input devices 710 and translates the input into commands for navigating imagery, as described in reference to FIGS. 1-5. If new imagery is needed, the system manager 722 requests the images from an image source (e.g., file system 606).

The embedded navigation interface, including the various controls, can be implemented using commercial software development tools, such as QT v3.35, developed by TrollTech® (Palo Alto, Calif.).

The operating system 716 can be multi-user, multiprocessing, multitasking, multithreading, real-time and the like. The operating system 716 performs basic tasks, including but not limited to: recognizing input from input devices 710; sending output to display devices 704; keeping track of files and directories on computer-readable mediums 712 (e.g., memory or a storage device); controlling peripheral devices (e.g., disk drives, printers, GPUs 706, etc.); and managing traffic on the one or more buses 714. The network communications module 718 includes various components for establishing and maintaining network connections (e.g., software for implementing communication protocols, such as TCP/IP, HTTP, Ethernet, etc.).

Various modifications may be made to the disclosed implementations and still be within the scope of the following claims.

What is claimed is:

1. A method of navigating imagery, comprising: providing a user interface for presentation on a display device, the user interface including a display area for presenting imagery;

providing a navigation interface overlying the imagery, the navigation interface including a rotation control for rotating the imagery in the display area in response to a user interaction with the rotation control, where the rotation control includes a direction indicating portion thereon, the direction indicating portion indicates a predetermined compass direction associated with the imagery;

receiving a user input invoking the direction indicating portion of the rotation control; and restoring the imagery and the rotation control synchronously to a predetermined orientation in the display area such that the direction indicating portion of the rotation control indicates the predetermined compass direction associated with the imagery.

2. The method of claim 1, where the rotation control is in the shape of a wheel.

3. The method of claim 1, further comprising:
incrementally rotating the imagery in the display area in response to a user interaction with the rotation control outside of the direction indicating portion.

4. The method of claim 1, further comprising:
providing a tilt control in the navigation interface for tilting the imagery in the display area.

5. The method of claim 4, further comprising
continuously tilting the imagery in response to a first user interaction with the tilt control; and
incrementally tilting the imagery in response to a second user interaction with the tilt control.

6. The method of claim 5, further comprising:
restoring the imagery to a predetermined tilt state in response to a third user interaction with the tilt control.

7. The method of claim 1, further comprising:
providing a zoom control in the navigation interface for zooming the imagery in the display area.

8. The method of claim 7, further comprising:
continuously zooming the imagery in response to a first user interaction with the zoom control; and
incrementally zooming the imagery in response to a second user interaction with the zoom control.

9. The method of claim 8, further comprising:
restoring the imagery to a predetermined zoom state in the display area in response to a third user interaction with the zoom control.

10. The method of claim 1, further comprising:
providing button controls in the navigation interface for moving the imagery up, down, left and right in the display area.

11. The method of claim 10, further comprising:
continuously moving the imagery in response to a first user interaction with the button controls; and
incrementally moving the imagery in response to a second user interaction with the button controls.

12. The method of claim 11, further comprising:
restoring the imagery to a predetermined state in the display area in response to a third user interaction with the button controls.

13. The method of claim 10 further comprising:
providing a joystick control in the navigation interface for moving the imagery 360 degrees in the display area in response to user interaction with the joystick control;
providing visual feedback on the joystick control in response to user interaction with one or more of the button controls.

14. The method of claim 1, where at least some of the imagery is three-dimensional.

15. The method of claim 1, further comprising:
displaying the navigation interface in the display area in response to a first user interaction with the navigation interface; and
obfuscating the navigation interface in the display area in response to a second user interaction with the navigation interface.

16. The method of claim 15, further comprising:
displaying a user interface element in place of the navigation interface when the navigation interface is obfuscated.

17. The method of claim 16, where the user interface element indicates direction.

18. A computer-readable medium having stored thereon instructions, which, when executed by a processor, causes the processor to perform the operations of:
providing a user interface for presentation on a display device, the user interface including a display area for presenting imagery;
providing a navigation interface overlying the imagery, the navigation interface including a rotation control for rotating the imagery in the display area in response to a user interaction with the rotation control, where the rotation control includes a direction indicating portion thereon, the direction indicating portion indicates a predetermined compass direction associated with the imagery;
receiving a user input invoking the direction indicating portion of the rotation control; and
restoring the imagery and the rotation control synchronously to a predetermined orientation in the display area such that the direction indicating portion of the rotation control indicates the predetermined compass direction associated with the imagery.

19. The computer readable medium of claim 18, where the rotation control is in the shape of a wheel.

20. The computer readable medium of claim 18, wherein the operations further comprise:
incrementally rotating the imagery in the display area in response to a user interaction with the rotation control outside of the direction indicating portion.

21. The computer-readable medium of claim 18, wherein the operations further comprise:
providing a tilt control in the navigation interface for tilting the imagery in the display area.

22. The computer-readable medium of claim 21, wherein the operations further comprise:
continuously tilting the imagery in response to a first user interaction with the tilt control; and
incrementally tilting the imagery in response to a second user interaction with the tilt control.

23. The computer-readable medium of claim 22, wherein the operations further comprise:
restoring the imagery to a predetermined tilt state in response to a third user interaction with the tilt control.

24. The computer-readable medium of claim 18, wherein the operations further comprise:
providing a zoom control in the navigation interface for zooming the imagery in the display area.

25. The computer-readable medium of claim 24, wherein the operations further comprise:
continuously zooming the imagery in response to a first user interaction with the zoom control; and
incrementally zooming the imagery in response to a second user interaction with the zoom control.

26. The computer-readable medium of claim 25, wherein the operations further comprise:
restoring the imagery to a predetermined zoom state in the display area in response to a third user interaction with the zoom control.

27. The computer-readable medium of claim 18, wherein the operations further comprise:
providing button controls in the navigation interface for moving the imagery up, down, left and right in the display area.

28. The computer-readable medium of claim 27, wherein the operations further comprise:
continuously moving the imagery in response to a first user interaction with the button controls; and
incrementally moving the imagery in response to a second user interaction with the button controls.

29. The computer-readable medium of claim 28, wherein the operations further comprise:
restoring the imagery to a predetermined state in the display area in response to a third user interaction with the button controls.

30. The computer-readable medium of claim 27, wherein the operations further comprise:
providing a joystick control in the navigation interface for moving the imagery 360 degrees in the display area in response to user interaction with the joystick control; and
providing visual feedback on the joystick control in response to user interaction with one or more of the button controls.

31. The computer-readable medium of claim 18, where at least some of the imagery is three-dimensional.

32. The computer-readable medium of claim 18, wherein the operations further comprise:
displaying the navigation interface in the display area in response to a first user interaction with the navigation interface; and
obfuscating the navigation interface in the display area in response to a second user interaction with the navigation interface.

33. The computer-readable medium of claim 32, wherein the operations further comprise:
displaying a user interface element in place of the navigation interface when the navigation interface is obfuscated.

34. The computer-readable medium of claim 33, wherein the user interface element indicates direction.

35. A system comprising:
one or more processors;
memory coupled to the one or more processors and storing instructions which, when executed by the one or more processors, cause the one or more processors to perform operations comprising:
providing a user interface for presentation on a display device, the user interface including a display area for presenting imagery;
providing a navigation interface overlying the imagery, the navigation interface including a rotation control for rotating the imagery in the display area in response to a user interaction with the rotation control, where the rotation control includes a direction indicating portion thereon, the direction indicating portion indicates a predetermined compass direction associated with the imagery;
receiving a user input invoking the direction indicating portion of the rotation control; and
restoring the imagery and the rotation control synchronously to a predetermined orientation in the display area such that the direction indicating portion of the rotation control indicates the predetermined compass direction associated with the imagery.

36. The system of claim 35, where the rotation control is in the shape of a wheel.

37. The system of claim 35, wherein the operations further comprise: incrementally rotating the imagery in the display area in response to a user interaction with the rotation control outside of the direction indicating portion.

38. The system of claim 35, wherein the operations further comprise: providing a tilt control in the navigation interface for tilting the imagery in the display area.

39. The system of claim 38, wherein the operations further comprise:
continuously tilting the imagery in response to a first user interaction with the tilt control; and
incrementally tilting the imagery in response to a second user interaction with the tilt control.

40. The system of claim 39, wherein the operations further comprise:
restoring the imagery to a predetermined tilt state in response to a third user interaction with the tilt control.

41. The system of claim 35, wherein the operations further comprise: providing a zoom control in the navigation interface for zooming the imagery in the display area.

42. The system of claim 41, wherein the operations further comprise:
continuously zooming the imagery in response to a first user interaction with the zoom control; and
incrementally zooming the imagery in response to a second user interaction with the zoom control.

43. The system of claim 42, wherein the operations further comprise:
restoring the imagery to a predetermined zoom state in the display area in response to a third user interaction with the zoom control.

44. The system of claim 35, wherein the operations further comprise:
providing button controls in the navigation interface for moving the imagery up, down, left and right in the display area.

45. The system of claim 44, wherein the operations further comprise:
continuously moving the imagery in response to a first user interaction with the button controls; and
incrementally moving the imagery in response to a second user interaction with the button controls.

46. The system of claim 45, wherein the operations further comprise:
restoring the imagery to a predetermined state in the display area in response to a third user interaction with the button controls.

47. The system of claim 45, wherein the operations further comprise:
providing a joystick control in the navigation interface for moving the imagery 360 degrees in the display area in response to user interaction with the joystick control; and
providing visual feedback on the joystick control in response to user interaction with one or more of the button controls.

48. The system of claim 35, where at least some of the imagery is three-dimensional.

49. The system of claim 35, wherein the operations further comprise:
displaying the navigation interface in the display area in response to a first user interaction with the navigation interface; and
obfuscating the navigation interface in the display area in response to a second user interaction with the navigation interface.

50. The system of claim 49, wherein the operations further comprise:
displaying a user interface element in place of the navigation interface when the navigation interface is obfuscated.

51. The system of claim 50, wherein the user interface element indicates direction.

* * * * *